US010390484B2

(12) United States Patent
Baert et al.

(10) Patent No.: US 10,390,484 B2
(45) Date of Patent: Aug. 27, 2019

(54) COMBINE HARVESTER IMPROVEMENT

(71) Applicant: CNH Industrial America LLC, New Holland, PA (US)

(72) Inventors: Matthias Baert, Assebroek (BE); Dré W. J. Jongmans, AG Klundert (NL); Bart M. A. Missotten, Herent (BE); Frederik Tallir, Esen (BE); Pieter Vandevelde, Sint Michiels (BE)

(73) Assignee: CNH Industrial America LLC, New Holland, PA (US)

( * ) Notice: Subject to any disclaimer, the term of this patent is extended or adjusted under 35 U.S.C. 154(b) by 196 days.

(21) Appl. No.: 15/663,408

(22) Filed: Jul. 28, 2017

(65) Prior Publication Data

US 2018/0042177 A1 Feb. 15, 2018

(30) Foreign Application Priority Data

Aug. 2, 2016 (BE) .................................. 2016/5624

(51) Int. Cl.

| | |
|---|---|
| ***A01D 41/127*** | (2006.01) |
| ***A01F 12/46*** | (2006.01) |
| ***G01F 1/78*** | (2006.01) |
| *A01F 12/60* | (2006.01) |

(52) U.S. Cl.

CPC .......... *A01D 41/1272* (2013.01); *A01F 12/46* (2013.01); *G01F 1/78* (2013.01); *A01F 12/60* (2013.01)

(58) Field of Classification Search

CPC .......... A01D 41/127; A01F 12/46; G01F 1/78
See application file for complete search history.

(56) References Cited

U.S. PATENT DOCUMENTS 4,157,661 A 6/1979 Schindel
4,765,190 A * 8/1988 Strubbe .............. A01D 41/1271 222/71
5,343,761 A * 9/1994 Myers .................... A01C 7/105 73/861
5,351,558 A 10/1994 Horn et al.
5,686,671 A 11/1997 Nelson et al.
5,959,218 A * 9/1999 Strubbe .............. A01D 41/1271 73/861.71
5,970,802 A 10/1999 Strubbe
(Continued)

FOREIGN PATENT DOCUMENTS

DE 102008011564 A1 9/2009
EP 0208025 A1 1/1987

*Primary Examiner* — Jewel V Dowtin
(74) *Attorney, Agent, or Firm* — Patrick M. Sheldrake; Peter K. Zacharias

(57) ABSTRACT

A grain mass flow sensor assembly of an agricultural harvester has a continuously curved sensor plate positioned to receive a grain flow from an exit of the grain elevator. The continuously curved sensor plate is configured to change the direction of the grain flow in order to generate a reaction force for measuring the grain mass flow rate of the grain flow. The continuously curved sensor plate is attached to a sensor plate to load cell mounting bracket. The sensor plate to load cell mounting bracket is attached to a single point load cell torque or moment compensated force transducer at a single mounting point. The single point load cell torque or moment compensated force transducer produces a mass flow sensor signal that is proportionate to the grain mass flow rate.

20 Claims, 14 Drawing Sheets

(56) References Cited

U.S. PATENT DOCUMENTS

| | | | | |
|---|---|---|---|---|
| 6,014,903 | A * | 1/2000 | Strubbe ................ | A01D 43/085 73/861.73 |
| 9,144,195 | B2 | 9/2015 | Koch et al. | |
| 9,506,786 | B2 | 11/2016 | Strnad et al. | |
| 2015/0168187 | A1 | 6/2015 | Myers | |
| 2016/0143222 | A1 | 5/2016 | Koch et al. | |

* cited by examiner

COMBINE HARVESTER IMPROVEMENT

CROSS REFERENCE TO RELATED APPLICATION

This application claims priority to Belgium Application No. 2016/5624 filed Aug. 2, 2016, the contents of which are incorporated herein by reference.

FIELD OF THE INVENTION

The present invention relates to agricultural harvesters, and, more specifically to a grain mass flow sensor for a combine.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely within the body of the combine, and which are partially or fully surrounded by a perforated concave. The crop material is threshed and separated by the rotation of the rotor within the concave. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

In order to measure the mass flow rate of clean grain entering the grain tank from the grain elevator of a combine, it is known to provide a grain mass flow sensor. Often, the grain mass flow sensor involves a sensor plate located at or near the outlet of the grain elevator. The grain elevator generally includes a long drive chain loop that extends vertically from the outlet of the clean grain auger near the bottom of the combine to the grain tank near the top of the combine, having paddles attached to certain of the chain links. Grain is carried upwards on the paddles and then flung outwardly towards the outlet of the grain elevator as the drive chain loop passes over the uppermost sprocket, where the sensor plate is located. As the velocity of the grain exiting the grain elevator may be known, the reaction force of the grain striking the sensor plate is then used to calculate the mass flow rate of grain entering the grain tank. This information may be used by other systems to calculate the yield, for example at various locations in a field.

Various difficulties arise from the use of a sensor plate type grain mass flow sensor. The grain to be measured may vary in bulk properties like moisture, coefficient of friction, coefficient of restitution, and cohesiveness as non-limiting and often crop, temperature, and humidity dependent examples. The grain mass flow sensor must function reliably and accurately in a machine that is operated off-road in fields that may be rough, uneven, and sloped, so that incline and vibration may affect the signals produced by the sensor. Further, the grain mass flow sensor, and all of its subcomponents, must operate in a dusty abrasive environment in the presence of moisture and temperature variations, and must be durable and robust during assembly and subsequent maintenance.

Prior art installations of grain mass flow sensors used in conjunction with grain elevators suffered further from the fact that grain flow proceeding from the grain elevator exit often did so in a relatively uncontrolled fashion. Rather than a coherent flow of grain impacting the sensor plate, the flow of grain was scattered so that some of the grain moved on a trajectory towards the sensor plate, and some of the grain moved on an oblique trajectory relative to the sensor plate. As a consequence, the relation between the grain flow and the mass flow sensor signal tended to be non-linear. Prior art installations of grain mass flow sensors also tended to produce imprecise results due to the variation in bulk properties of the grain, due to changes in incline of the combine, due to vibration, due to drift of the load cell output, and due to the high range of measurements involved.

Certain prior art references have addressed one or more of these problems individually, but none have fully addressed all of the problems. U.S. Pat. Nos. 5,736,652 and 5,970,802 provide a curved sensor plate that compensates for variations in the frictional properties of the grain. However, the sensors used are torsional in nature, relying on springs or counterweights to provide the reaction force and upon a tangential displacement sensor. Such torsional arrangements have been determined not to be sufficiently robust to endure the harsh environment, and are susceptible to greater output variation due to changes in incline or vibrations, which must be compensated to a greater degree using inclinometers. Alternately, U.S. Pat. Nos. 5,736,652 and 5,970,802 utilize multi-point sensor arrangements unsuitable for use near the grain elevator exit. U.S. Pat. No. 5,343,761 uses a moment compensated load beam type of sensor that compensates for the center of the grain flow striking the sensor plate other than perpendicular to the load beam. However, U.S. Pat. No. 5,343,761 does not compensate for variations in the frictional properties of the grain except by use of a non-linear calibration for various grain types and moisture.

E.P. Patent No. 2,742,324 uses a curved sensor plate near the top of the elevator attached to a hall effect sensor or to parallel springs having strain gauges. However, it makes no provision for compensation in the frictional properties of the grain, except for a complicated calibration routine using empirical test weights, multipliers, and offsets. Furthermore, the arrangement in E.P. Patent No. 2,742,324 relies upon early contact of the grain flow with the grain mass flow sensor assembly as the grain separates from the grain elevator paddles as the grain elevator drive chain loop passes over the upper sprocket. Locating the curved sensor plate near the top of the elevator in this way is done in order to attempt to measure the grain mass flow rate before the grain flow loses its "contiguous shape," which may or may not be accomplished, depending on the bulk properties of the grain flow. Additionally, the measuring accomplished by the sensor plate arrangement in E.P. Patent No. 2,742,324 all takes place over an arc of about 15 to 30 degrees, which limits accuracy.

E.P. Patent No. 1,169,905 provides for controlled grain flow from the exit of the grain elevator using a curved guide surface that extends from the exit of the grain elevator to the grain mass flow sensor assembly. This concentrates the grain flow, resulting in a more linear relationship between the grain mass flow rate and the mass flow sensor signal. Further, E.P. Patent No. 1,169,905 uses a curved sensor plate and a pivot point chosen in order to minimize the effects of friction and other variable bulk properties of the grain flow. The use of a counterweight is intended to minimize the effects of inclines on the signal output. However, E.P. Patent No. 1,169,905 still used a torsional sensor, which the present inventors have found to be insufficiently robust and susceptible to inaccuracy under certain conditions. Specifically, the use of a counterweight to balance the tare weight of the sensor plate tends to make the sensor mechanism heavier, so that it cannot react as quickly to changes in the force being applied to the sensor plate, and so that heavier bracketry is required to support the grain mass flow sensor assembly. Further, while a counterweight arrangement of this type may cancel out the effect of incline or slope angle, it inherently makes the output signal more susceptible to errors due to increased overall tare weight of the measurement mechanism reacting to lateral or longitudinal accelerations of the overall system, for example as the upper part of the combine moves sideways as the combine rolls back and forth about its longitudinal center of gravity over uneven ground.

Alternative methods of determining grain mass flow have been used with various levels of success without attaining to the desired level of overall accuracy. An example of such alternative method is measuring the tension of the belt driving the grain elevator itself, coupled with determining the speed of the elevator, in order to determine the mass of grain being lifted. In this arrangement, the effect of inclines upon the weight of the pulley being used to measure the tension of the belt is compensated for using a slope sensor. However, using the tension of the belt driving the grain elevator to determine the mass of grain being lifted is further susceptible to effects from the bulk properties of the grain such as friction and cohesiveness, for example as the grain elevator paddles engage the accumulated mass of grain at the bottom of the grain elevator.

What is needed in the art, therefore, is grain mass flow sensor arrangement that produces an accurate relationship between grain mass flow rate and the mass flow sensor signal over a high range of measurement and with high instantaneous accuracy. What is further needed is a grain mass flow sensor arrangement that compensates for slopes, inclines, and unevenness without adding extra tare weight to the measurement mechanism. A grain mass flow sensor arrangement is needed that functions reliably and accurately despite vibration, dust, and abrasion. What is further needed is a grain mass flow sensor arrangement that is durable for assembly and maintenance. Finally, a grain mass flow sensor arrangement is needed that measures the mass flow of grain flowing in a controlled coherent fashion, and that compensates for variable bulk properties of the grain, such as friction, crop type, bulk density, moisture, and cohesiveness, while requiring minimum calibration.

SUMMARY OF THE INVENTION

The present invention provides a grain mass flow sensor arrangement that produces an accurate relationship between grain mass flow rate and the mass flow sensor signal over a high range of measurement and with a high instantaneous accuracy, while requiring a minimum amount of calibration. The accurate relationship between the grain mass flow rate and the mass flow sensor signal may be a linear or non-linear function relating the mass flow sensor signal to the grain mass flow rate. Embodiments of the present invention compensate for slopes, inclines, and accelerations without adding significant extra weight to the grain mass flow sensor assembly. The grain mass flow sensor assembly according to the present invention functions reliably and accurately despite vibration, dust, and abrasion, and is durable for assembly and maintenance. The grain mass flow sensor assembly according to the present invention measures the mass flow of grain while providing a signal output that is linearly or non-linearly related to the grain mass flow and largely independent of the effects of friction, crop type, moisture, and cohesiveness.

The present invention utilizes a single point load cell torque or moment compensated force transducer connected to a continuously curved sensor plate, both of which are positioned to take advantage of geometry that reduces friction effects. The single point load cell torque or moment compensated force transducer is very robust for assembly and service, and maintains a stable output signal for a given amount of force, with no torque or moment effects on the output signal. The single point load cell torque or moment compensated force transducer has a high range of measurement and a greater instantaneous accuracy, while producing a linear or non-linear mass flow sensor signal relative to the grain mass flow rate.

A dual axis slope sensor may be provided to compensate for slopes, inclines, and dynamic accelerations, in which the signal dynamics of the dual axis slope sensor are aligned with the signal dynamics of the single point load cell torque or moment compensated force transducer. That is to say, the dual axis slope sensor may be so specified to produce an output signal that changes in response to changing slope and inclination in the same proportion to changes in the output signal of the single point load cell torque or moment compensated force transducer connected to the continuously curved sensor plate in a no-flow condition in response to the same changes in slope and inclination. Alternately, a dummy load cell and dummy weight may be provided arranged such that the weight and dynamics of the dummy load cell and dummy weight simulate the no-flow tare weight characteristics and dynamics of the single point load cell torque or moment compensated force transducer connected to the continuously curved sensor plate.

An electronic control system may be provided, which may be a dedicated electronic control system or may be integrated with another electronic control system of the combine. The electronic control system may operate to process the signal output of the single point load cell torque or moment compensated force transducer, along with the output of the dual axis slope sensor or dummy load cell, which the electronic control system may be used to correct the output of the single point load cell torque or moment compensated force transducer in order to compensate for slopes, inclines, and dynamic accelerations. The output signal produced by the dual axis slope sensor or the output signal produced by the dummy load cell, as applicable, may be filtered by the electronic control system to improve the correlation of either with respect to the characteristic response of the single point load cell torque or moment compensated force transducer and continuously curved sensor plate to changes in slope, incline, and dynamic accelerations.

The present invention concentrates grain flow exiting the grain elevator so that it enters the continuously curved sensor plate in a focused manner near its leading edge, and remains largely in coherent contact with the continuously curved sensor plate through its entire curvature, thereby generating a reaction force that more accurately correlates to the actual grain mass flow. The continuously curved sensor plate and the single point load cell torque or moment compensated force transducer are again positioned such that the geometry of forces involved largely cancel out the effects of friction. The single mounting point between the bracket holding the continuously curved sensor plate and the single point load cell torque or moment compensated force transducer minimizes erroneous readings due to uneven force transmission that may occur with prior art sensors involving two or more mounting points between the bracket holding the continuously curved sensor plate and the sensor itself. Note that there may be two or more mounting points between the bracket holding the continuously curved sensor plate and the continuously curved sensor plate itself, such as spacers extending through a sensor plate cover. The term "single point" of the single point load cell torque or moment compensated force transducer refers to the single mounting point between the bracket and the force transducer. In this way, the amount of calibration points required to calibrate the signal output of the single point load cell torque compensated force transducer to the real grain mass flow rate are minimized.

The "term torque or moment compensated" in reference to the single point load cell torque or moment compensated force transducer refers to an arrangement of strain or displacement sensors within the single point load cell torque or moment compensated force transducer that provides a signal or signal change as a result of a net force only in the desired force measuring direction and/or a net torque or moment only about the desired torque or moment measuring point. Any torque or moment generated other than at the desired torque or moment measuring point, and/or any net force in other than the desired force measuring direction as a result of uneven grain flow is cancelled out.

A non-limiting example of such an arrangement may be two or more strain or displacement sensors arranged on one or more bending and/or torsional beams within the single point load cell torque or moment compensated force transducer, so that the output of both strain or displacement sensors are positive or change in a positive direction when the beam is, for example, in compression as a result of a net force in the desired force measuring direction or twisted as a result of a torque or moment about the desired torque or moment measuring point.

The two or more strain or displacement sensors may accordingly be arranged on the one or more bending and/or torsional beams so that the output of one strain or displacement sensor is positive or changes in a positive direction and the output of the other strain or displacement sensor is negative or changes in a negative direction when the beam is, for example, in bending or twisted as a result of a torque or moment not about the desired torque or moment measuring point, or in bending or twisted as a result of a net force not in the desired force measuring direction. An electronic circuit such as a bridge circuit, as a non-limiting example, may be used to sum the outputs of the strain or displacement sensors. Alternately, an electronic processor may be used to sum or process the outputs of the strain or displacement sensors.

The invention in one form is directed to a grain mass flow sensor assembly of an agricultural harvester. The agricultural harvester has a threshing and separating system, a cleaning system, and a grain elevator. A continuously curved sensor plate is positioned to receive a grain flow from an exit of the grain elevator. The continuously curved sensor plate is configured to change the direction of the grain flow in order to generate a reaction force for measuring the grain mass flow rate of the grain flow. The continuously curved sensor plate is attached to a sensor plate to load cell mounting bracket. The sensor plate to load cell mounting bracket is attached to a single point load cell torque or moment compensated force transducer at a single mounting point. The single point load cell torque or moment compensated force transducer produces a mass flow sensor signal that is linearly or non-linearly proportionate to the grain mass flow rate.

An advantage of the present invention is that the relationship between the mass flow sensor signal and the actual grain mass flow rate is much more accurate over a high range of measurement and with a high instantaneous accuracy, and calibration is not needed at different grain mass flow rates. Calibration is also not needed according to crop type or at different moisture contents. The single point load cell torque or moment compensated force transducer is more robust for assembly and for service and maintenance in a harsh environment. The present invention functions largely independent of the frictional properties of the crop material.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material that is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
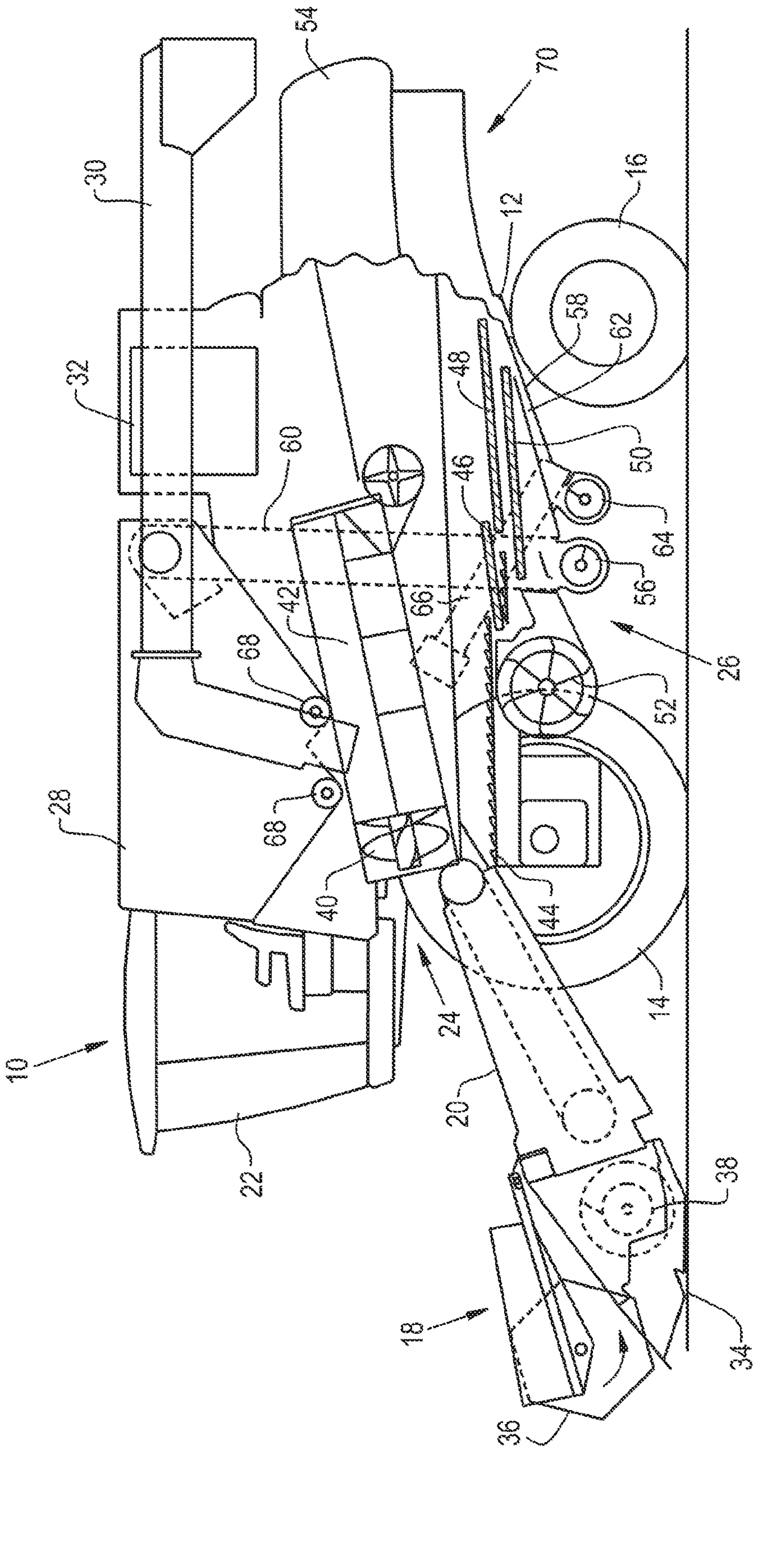
FIG. 1 is a side view of an agricultural harvester in the form of a combine.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc.

The front wheels 14 are larger flotation type wheels, and rear wheels 16 are smaller steerable wheels. Motive force is selectively applied to the front wheels 14 through a power plant in the form of a diesel engine 32 and a transmission (not shown). Although the combine 10 is shown as including wheels, is also to be understood that the combine 10 may include tracks, such as full tracks or half-tracks.

The header 18 is mounted to the front of the combine 10 and includes a cutter bar 34 for severing crops from a field during forward motion of combine 10. A rotatable reel 36 feeds the crop into the header 18, and a double auger 38 feeds the severed crop laterally inwardly from each side toward the feeder housing 20. The feeder housing 20 conveys the cut crop to threshing and the separating system 24, and is selectively vertically movable using appropriate actuators, such as hydraulic cylinders (not shown).

The threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42.

Grain that has been separated by the threshing and separating assembly 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52, which provides an airflow through the sieves to remove MOG, residue, chaff, and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of the lower sieve 50. The clean grain auger 56 receives clean grain from each sieve 48, 50 and from bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10. A residue handling system 70 integrated in the rear of the harvester 10 receives airborne MOG, residue, and chaff from the threshing and separating system 24 and from the cleaning system 26.

Figure 2:
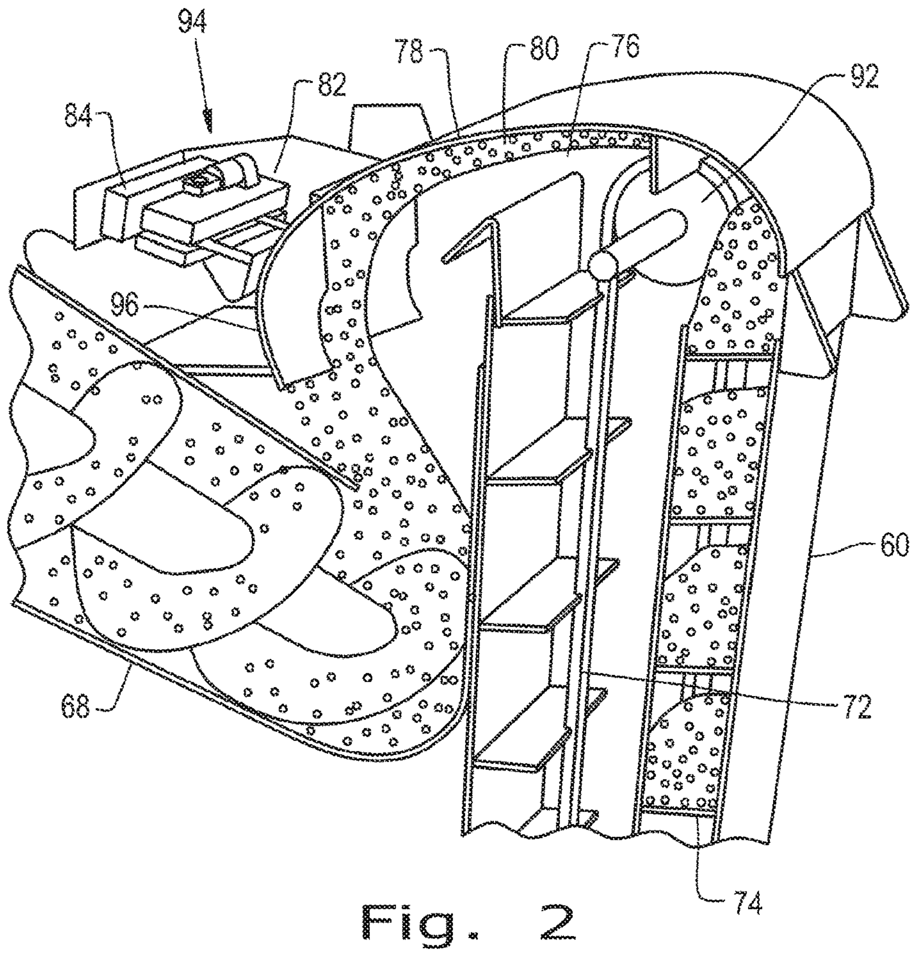
FIG. 2 is an isometric sectional view of a prior art grain elevator and grain mass flow sensor arrangement of a combine.

Turning now to FIG. 2, a grain mass flow sensor assembly 94 according to the prior art is shown including a curved sensor plate 96 connected to a torque sensor 82. A counterweight 84 balances the mass of the curved sensor plate 96 in order to compensate for the tare weight of the curved sensor plate 96, and in order to reduce the effect of changes in slope and incline on the output of the torque sensor 82. A grain elevator 60 uses a drive chain loop 72 to certain links of which are connected grain elevator paddles 74. Grain is raised upwards by the grain elevator paddles 74 until the grain elevator drive chain loop 72 passes over a grain elevator upper sprocket 92, at which point the grain is flung forward towards the grain elevator exit 76. As the grain flow 80 is flung forward, it proceeds along a grain elevator exit concentration plate 78, which causes the grain flow 80 to narrow into a more coherent stream. The grain flow 80 then impacts the curved sensor plate 96, which causes the grain flow 80 to change direction, thereby imparting a reaction force to the curved sensor plate 96. Because the velocity of the grain flow 80 is known as a function of the speed of the grain elevator paddles 74, the reaction force information acquired by the torque sensor 82 from the force transmitted by the curved sensor plate 96 may be used to calculate the grain mass flow rate of grain proceeding to the grain tank 28 (not shown in FIG. 2). The grain flow 80 then proceeds to the grain tank 28 by way of the cross augers 68.

Figure 3:
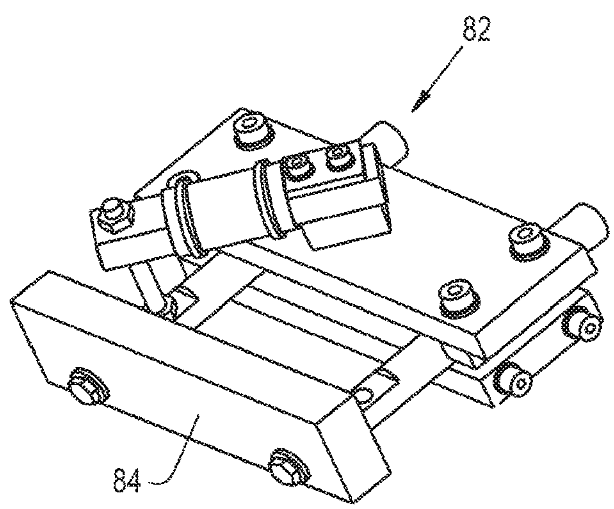
FIG. 3 is an isometric view of a prior art torque sensor of the grain mass flow sensor arrangement of a combine shown in FIG. 2.

FIG. 3 shows an embodiment of the type of torque sensor 82 used in prior art grain mass flow sensor assembly 94. As can be seen, the torque sensor 82 is provided with a counterweight 84 in order to balance the tare weight of the curved sensor plate 96 (not shown in FIG. 3) and in order to reduce the effects of slopes and inclines on signal output of the torque sensor 82. However, the torque sensor 82 has proved to not be sufficiently robust and reliable. It requires to a greater degree that the grain flow 80 proceeding from the grain elevator exit 76 be centered upon the upper part of the curved sensor plate 96, in order to produce somewhat accurate results. Further, it suffers from increased weight due to the counterweight 84, so that it cannot react as quickly to changes in the force being applied to the curved sensor plate 96, and so that heavier bracketry is required to support the grain mass flow sensor assembly 94. Further, while a counterweight arrangement of this type may cancel out the effect of incline or slope angle, it inherently makes the output signal more susceptible to errors due to increased overall tare weight of the grain mass flow sensor assembly 94 reacting to lateral or longitudinal accelerations of the overall system, for example as the upper part of the combine 10 moves sideways as the combine 10 rolls back and forth about its longitudinal center of gravity over uneven ground, as noted previously.

Figure 4:
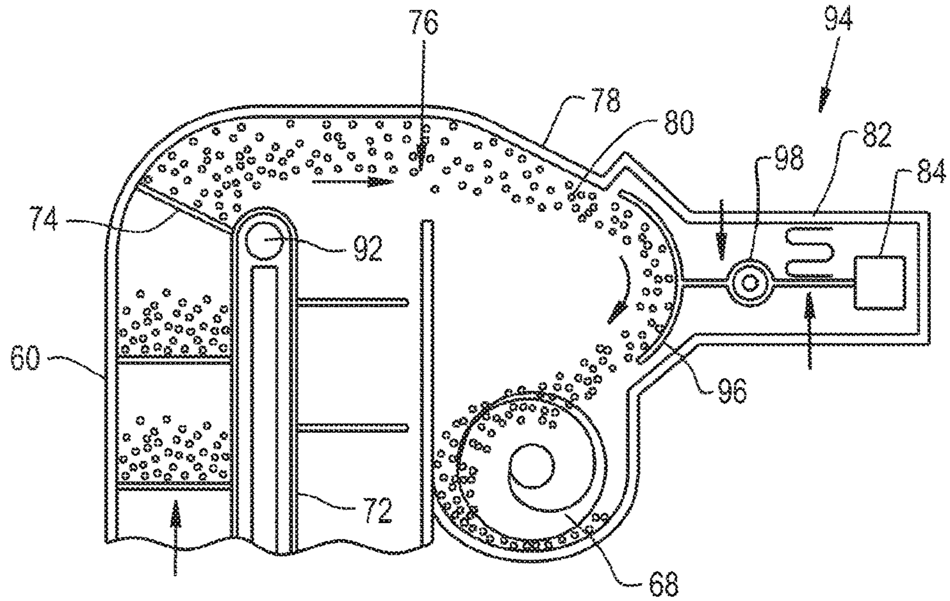
FIG. 4 is a section view of the prior art grain elevator and grain mass flow sensor arrangement of a combine shown in FIG. 2.

FIG. 4 again shows a sectional view of the grain mass flow sensor assembly 94 according to the prior art, including curved sensor plate 96 connected to torque sensor 82 having counterweight 84. A grain elevator 60 again uses drive chain loop 72 having grain elevator paddles 74 that carry grain upwards until the grain elevator drive chain loop 72 passes over the grain elevator upper sprocket 92, flinging grain flow 80 forward through grain elevator exit 76. As the grain flow 80 is flung forward through the grain elevator exit 76, it again proceeds along grain elevator exit concentration plate 78, thereby narrowing into a more coherent stream, before impacting the curved sensor plate 96, thereby imparting a reaction force to the curved sensor plate 96. Pivot point 98 is chosen to minimize the effect of the frictional properties of the grain flow 80 on the signal output of the torque sensor 82.

Figure 5:
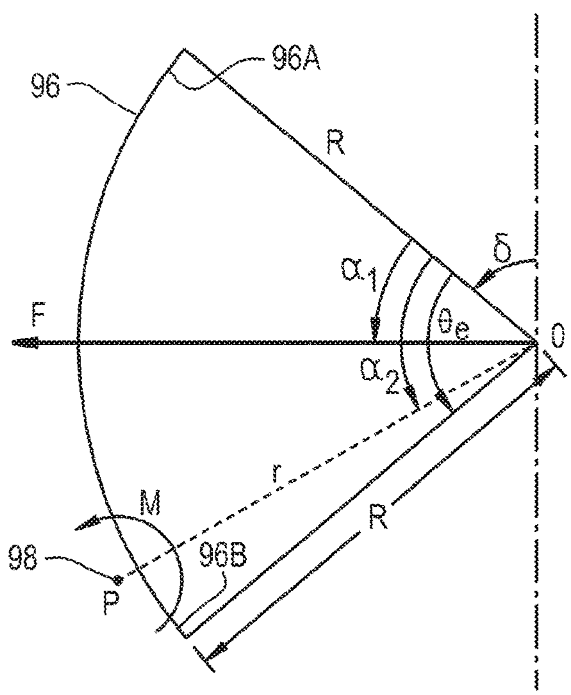
FIG. 5 is a force diagram providing for measurement of a reaction force independent of frictional properties of the crop.

FIG. 5 shows a force diagram by which a pivot point 98 may be chosen to provide for measurement of a reaction force substantially independent of the frictional properties of the crop using a curved sensor plate 96. Curved sensor plate 96 is a circular arc of radius R in profile, and includes an inlet region 96*a* at its upper end and an exit region 96*b* at its lower end, at which points the grain flow 80 engages and disengages from the curved sensor plate 96, respectively. A normal to inlet region 96*a* is inclined at an angle $\delta$ to the vertical in the installation of the curved sensor plate 96. The angular length of the curved sensor plate is denoted by $\theta_e$. Force F is measured in a desired force measuring direction $\alpha_1$ and the pivot for moment measurement is located at a desired torque or moment measuring point at polar coordinate ($\alpha_2$, r). A first condition that must be met in order for the measurement of the reaction force to be substantially independent of the frictional properties of the crop is that the inclination angle must be equal to:

$$\delta=90^\circ-(\theta e/2).$$

A second condition is that r/R be equal to:

$$r/R=\frac{(\cos(\delta+\alpha_1)-(G_1/G)\cdot\sin(\theta e-\alpha_1))}{(\cos(\theta e-\alpha_2)\cdot\cos(\delta+\alpha_1)-\sin(\delta+\alpha_2)\cdot\sin(\theta e-\alpha_1))}$$

in which:

$$G=Q\cdot g\cdot R\cdot\int_0^{\theta e}\frac{d\theta}{v}$$

Q being the mass flow rate of the grain, and $$G=Q\cdot g\cdot R\cdot\int_0^{\theta e}\frac{d(\delta+\theta)\cdot d\theta}{v}$$

Then Q can be derived from:

$$Q \cdot v_0 = \frac{F \cdot R \cdot S + M \cdot \cos(\delta + \alpha_1)}{R \cdot S \cdot \sin\alpha_1 + (R - r \cdot \cos\alpha_2) \cdot \cos(\delta + \alpha_1)}$$

where S is a dimensionless value.

Figure 6:
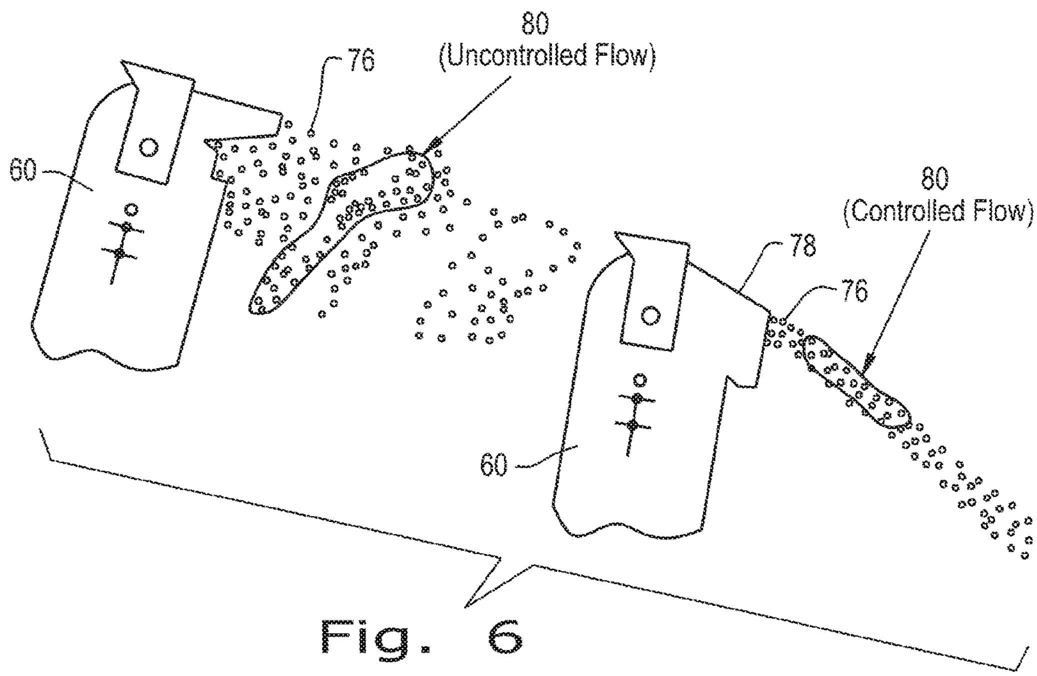
FIG. 6 is a comparison view of grain flow proceeding from a grain elevator with and without a grain flow concentration plate.

FIG. 6 shows an illustration of controlled versus uncontrolled grain flow 80 proceeding from grain elevator exits 76 of two different grain elevators 60. The grain elevator 60 to the left has an approximately straight and perpendicular grain elevator exit 76, resulting in a grain flow 80 that is largely scattered and lacks a tightly directed flow pattern. The grain elevator 60 to the right has a grain elevator exit 76 having a concentration plate 78 which by virtue of its slight downward angle and slight concave curvature, results in a grain flow 80 that is concentrated in a tightly directed flow pattern.

Figure 7:
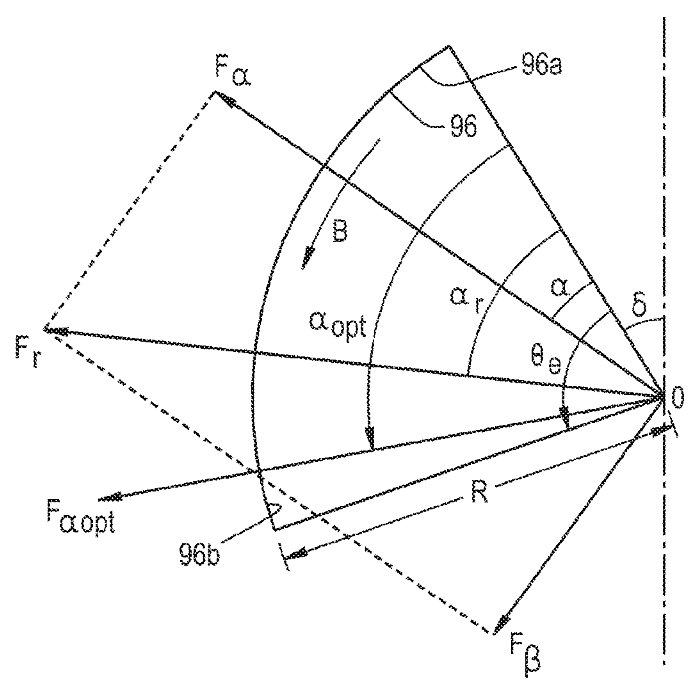
FIG. 7 is a force diagram providing for measurement of a reaction force independent of frictional properties of the crop.
Figure 8:
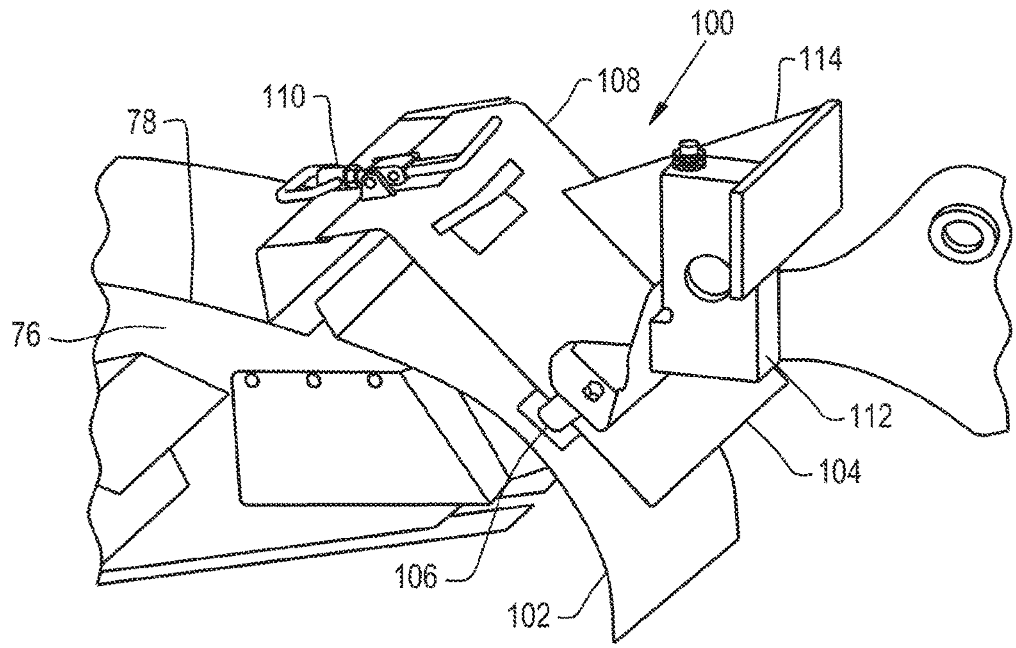
FIG. 8 is a top rear isometric view of a grain mass flow sensor assembly according to an embodiment of the invention.
Figure 9:
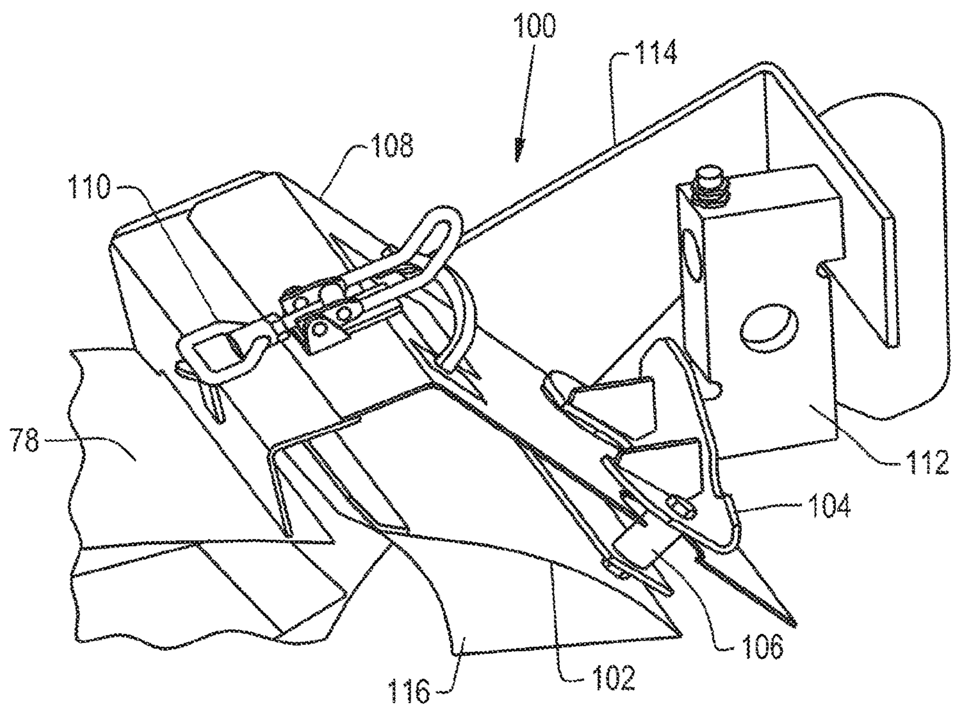
FIG. 9 is a top front isometric view of a grain mass flow sensor assembly according to an embodiment of the invention.
Figure 10:
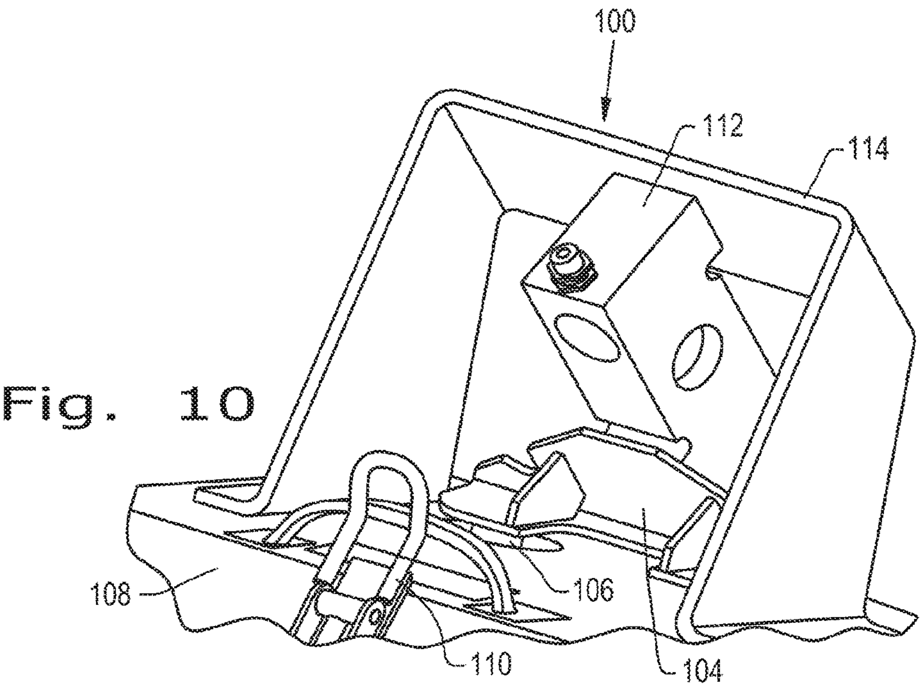
FIG. 10 is a top front isometric detail view of a single point load cell torque or moment compensated force transducer used in a grain mass flow sensor assembly according to an embodiment of the invention.
Figure 11:
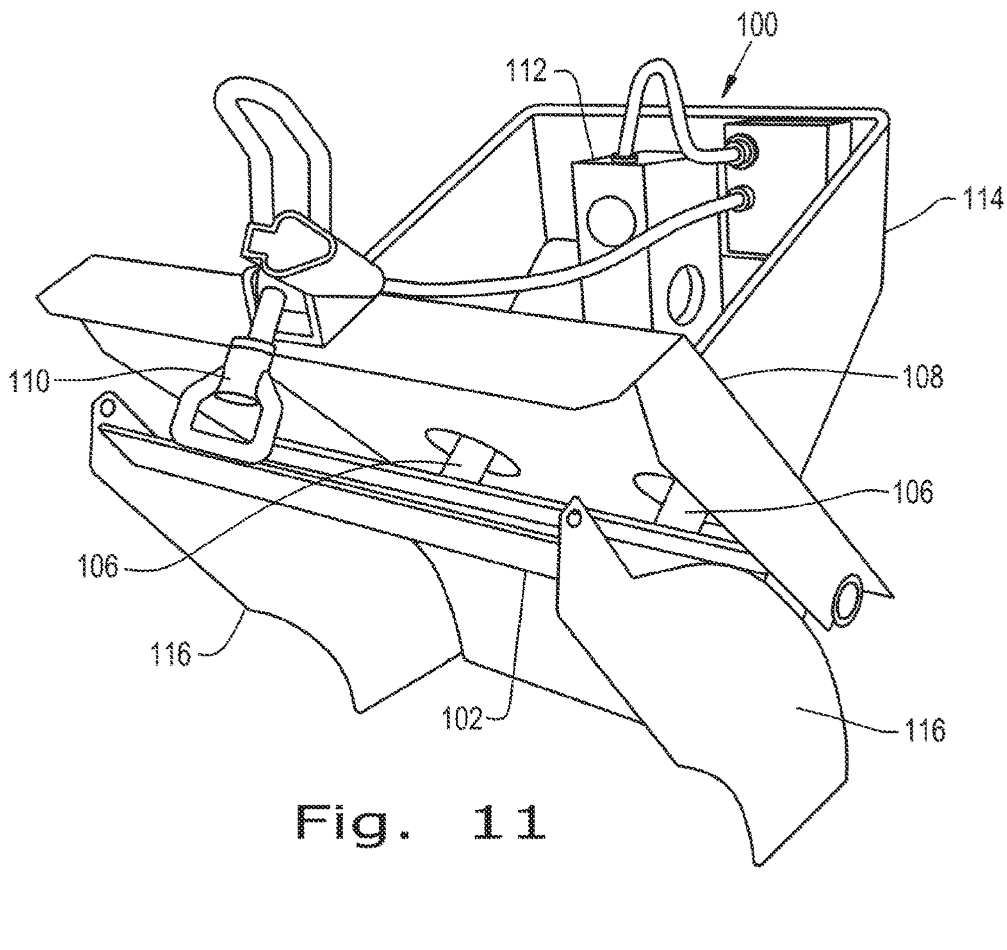
FIG. 11 is an isometric view of a grain mass flow sensor assembly according to an embodiment of the invention.

FIG. 7 shows another force diagram providing for measurement of a reaction force substantially independent of the frictional properties of the crop. Curved sensor plate 96 is a circular arc of radius R in profile, and includes an inlet region 96*a* at its upper end and an exit region 96*b* at its lower end, at which points the grain flow 80 engages and disengages from the curved sensor plate 96, respectively. A normal to inlet region 96*a* is inclined at an angle $\delta$ to the vertical in the installation of the curved sensor plate 96. The angular length of the curved sensor plate is denoted by $\theta_e$. The reaction force of the grain flow 80 acting on the curved sensor plate 96 may be considered as a resultant force $F_r$ acting in a direction defined by the angle $\alpha_r$ measured from the normal to the inlet region 96*a*. Force $F_r$, may be resolved into two preferably mutually perpendicular components $F_\alpha$ (acting in a direction defined by angle $\alpha$ from the normal to inlet region 96*a*) and $F_\beta$ (acting as right angles thereto). The continuous and simultaneous measurement of these two forces permits a friction-independent determination of the grain mass flow rate.

The friction-independent force component $F_{\alpha opt}$ may be derived from the two forces $F_\alpha$ and $F_\beta$, measured in two preferably, but not necessarily, perpendicular directions $\alpha$ and $\beta$. $F_{\alpha opt}$ can be calculated from:

$$F_{\alpha opt} = F_r \cdot \cos(\alpha_{opt} - \alpha_r)$$

When directions $\alpha$ and $\beta$ are perpendicular to each other, $\alpha_r$ and $F_r$ may be calculated from:

$$\alpha_r = \alpha + \arctan(F_\beta / F_\alpha)$$

and $$F^2_r = F^2_\alpha + F^2_\beta$$

$F_\alpha$ and $F_\beta$ are derived from the two force measurements simultaneously carried out during use of the apparatus and the direction $\alpha_{opt}$ is a fixed installation dependent parameter. The resulting force $F_{\alpha opt}$ is proportional to $Q \cdot v_o$ and can be used for determining the mass flow rate Q. The force $F_{\alpha\beta}$, or the combination of two forces $F_\alpha$ and $F_\beta$, is defined as:

$$F_{\alpha\beta} = F_\alpha \cdot \cos(\delta + \beta) - F_\beta \cdot \cos(\delta + \alpha)$$

Friction independent mass flow measurement can be obtained if:

$$\theta_e + \delta = 90°$$

In this case, the combined force $F_{\alpha\beta}$ is proportional to the mass flow rate:

$$F_{\alpha\beta} = Q \cdot v_0 \cdot \cos\delta \cdot \sin(\alpha - \beta)$$

This formula does not contain any friction dependent variables and hence can be used for calculating the mass flow rate Q.

Turning now to FIGS. 8 through 11, an embodiment of the present invention is shown, being a grain mass flow sensor assembly 100 using a single point load cell in the form of a torque or moment compensated force transducer 112. The single point load cell torque or moment compensated force transducer 112 is attached to a sensor plate cover 108 by way of a load cell mounting bracket 114. The sensor plate cover 108, in turn, is retained to the exterior structure of the grain elevator 60 (not shown) near the grain elevator exit 76 by a sensor assembly latch 110. The single point load cell torque or moment compensated force transducer 112 is further connected to a continuously curved sensor plate 102 by way of a sensor plate to load cell mounting bracket 104 and sensor plate support spacers 106. Grain flow 80 (not shown in FIGS. 8-11) proceeds from the grain elevator exit 76 and is guided to the continuously curved sensor plate 102 by a grain elevator exit concentration plate 78, which functions to focus the flow of grain 80 into a controlled coherent stream. Continuously curved sensor plate sidewalls 116 prevent the flow of grain 80 from spreading beyond the lateral ends of the continuously curved sensor plate 102.

The point at which the sensor plate to load cell mounting bracket 104 connects to the single point load cell torque or moment compensated force transducer 112, along with the orientation of the continuously curved sensor plate 102 and of the single point load cell torque or moment compensated force transducer 112, corresponds with the force diagram given in FIG. 7 or with the force and moment diagram given in FIG. 5. As noted previously, the single point load cell torque or moment compensated force transducer 112 may be internally provided with an appropriate arrangement of one or more bending and/or torsional beams, or their equivalent, and with two or more strain and/or displacement sensors, or their equivalent, so that any torque or moment generated other than at the desired torque or moment measuring point, or any net force in other that the desired force measuring direction as a result of uneven grain flow 80 is cancelled out. In this way, the measurement of the reaction force and/or moment is substantially independent of the frictional properties of the crop. The grain elevator exit concentration plate 78 directs the flow of grain 80 so that it engages the continuously curved sensor plate 102 near the inlet region 96*a* as represented in FIG. 7, which flow of grain 80 flows along the continuously curved sensor plate 102 through to the exit region 96*b* as represented in FIG. 7, thereby generating a reaction force and/or moment that more accurately correlates to the actual grain mass flow.

The single point load cell torque or moment compensated force transducer 112 is to a greater extent an enclosed design as opposed to the prior art torque sensor 82. This has advantages such as less susceptibility to contamination and greater durability during assembly, during use, and during servicing. The single point load cell torque or moment compensated force transducer 112 has a high range of measurement while producing an accurate linear or non-linear mass flow sensor signal relative to the grain mass flow rate. Further, the single point load cell torque or moment compensated force transducer 112 has greater instantaneous accuracy, requires minimum calibration, and remains stable in terms of output for a greater amount of operating time. The single point load cell torque or moment compensated force transducer 112 may be connected to an electronic control system (not shown) for processing the signal output of the single point load cell torque or moment compensated force transducer 112, which electronic control system may be a control module dedicated to the single point load cell torque or moment compensated force transducer 112, or may be part of another electronic control system of the combine 10.

Additionally, the continuously curved sensor plate 102 is attached to the sensor plate to load cell mounting bracket 104 by way of the sensor plate support spacers 106, whereas the sensor plate to load cell mounting bracket 104 itself is attached to the single point load cell torque or moment compensated force transducer 112 at a single mounting point. This is unlike the prior art grain mass flow sensor assembly 94 shown in FIG. 2, wherein the curved sensor plate 96 is connected to the torque sensor 82 at two points. In the prior art grain mass flow sensor assembly 94, the torque sensor 82 relies, among other things, upon the force being transmitted through the two mounting points equally in order for the output signal to remain accurate. This may result in erroneous readings if the grain flow 80 passes through the grain elevator exit 76 asymmetrically. Further, the curved sensor plate 96 of the prior art may twist on its mounting, further resulting in erroneous readings, which the more robust single point mounting of the sensor plate to load cell mounting bracket 104 to the single point load cell torque or moment compensated force transducer 112 of the present invention prevents.

In order to compensate for inclines and slopes, while preserving the advantages of a single point load cell torque or moment compensated force transducer 112 receiving the reaction force by way of a continuously curved sensor plate 102 arranged in such a way as to be substantially independent of the frictional properties of the grain flow 80 through a single mounting point, a dual axis slope sensor (not shown) may be provided anywhere on the grain mass flow sensor assembly 100, or elsewhere on the combine 10. The dual axis slope sensor is used by the electronic control system to compensate for the weight, or tare signal, of the continuously curved sensor plate 102 under various slope and incline conditions of the combine 10.

In order to compensate for dynamic accelerations and other dynamic effects, the signal dynamics of the dual axis slope sensor are aligned with the signal dynamics of the single point load cell torque or moment compensated force transducer 112. In other words, the dual axis slope sensor is so specified that it reacts with the same or proportionate time constants, inertial responses, and moments of inertia. In this way, if the slope or incline of the combine changes suddenly, or the grain mass flow sensor assembly 100 otherwise undergoes a linear or torsional acceleration, both the dual axis slope sensor and the single point load cell torque or moment compensated force transducer 112 in a no-flow condition react with the same time constants. The measurement of the grain mass flow can therefore be isolated by the electronic control system from any effects of slope, incline, linear acceleration, or torsional acceleration.

In an alternate embodiment of the present invention, a dummy load cell (not shown) having a dummy weight is used to compensate for inclines, slopes, dynamic accelerations, and other dynamic effects. The dummy load cell and dummy weight, like the dual axis slope sensor embodiment, is again so specified that it reacts with the same or proportionate time constants, inertial responses, and moments of inertia. The effect of the slope or dynamic acceleration on the dummy load cell with the dummy weight is then used by the electronic control system to correct the output signal of the single point load cell torque or moment compensated force transducer 112.

Figure 12:
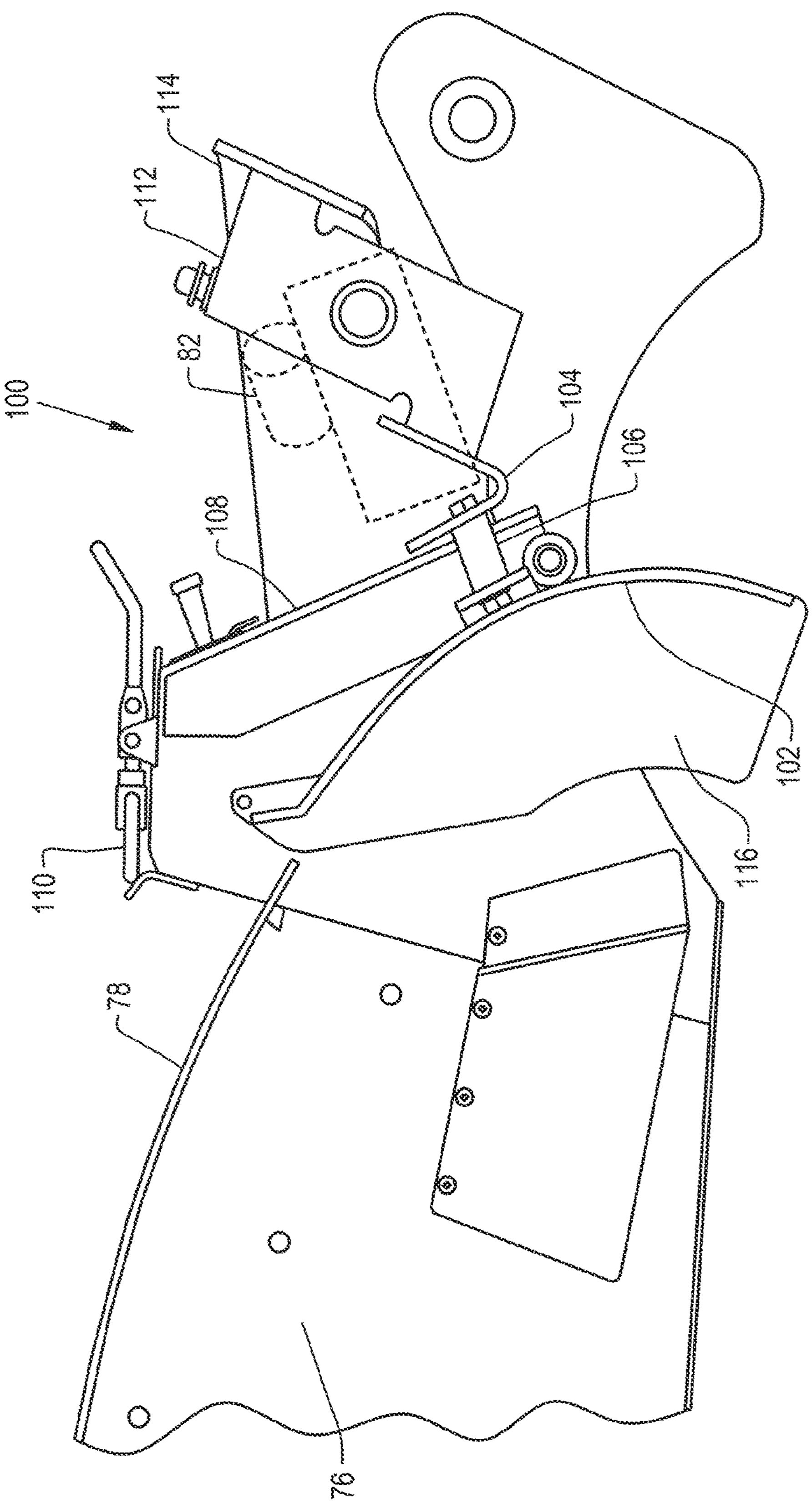
FIG. 12 is a section view of a grain mass flow sensor assembly according to an embodiment of the invention, with a prior art torque sensor superimposed.

FIG. 12 again shows an embodiment of the present invention, being a grain mass flow sensor assembly 100 using a single point load cell torque or moment compensated force transducer 112. The single point load cell torque or moment compensated force transducer 112 is again attached to a sensor plate cover 108 by way of a load cell mounting bracket 114. The sensor plate cover 108, in turn, is retained to the exterior structure of the grain elevator 60 (not shown) near the grain elevator exit 76 by a sensor assembly latch 110. The single point load cell torque or moment compensated force transducer 112 is again connected to the continuously curved sensor plate 102 by way of a sensor plate to load cell mounting bracket 104 and sensor plate support spacers 106. Grain flow 80 (not shown in FIG. 12) proceeds from the grain elevator exit 76 and is guided to the continuously curved sensor plate 102 by a grain elevator exit concentration plate 78. Continuously curved sensor plate sidewalls 116 prevent the flow of grain 80 from spreading beyond the lateral ends of the continuously curved sensor plate 102. For geometric comparison, the prior art torque sensor 82 is shown superimposed over the single point load cell torque or moment compensated force transducer 112. This shows the arrangement by which the single point load cell torque or moment compensated force transducer 112 is substantially independent of the frictional properties of the crop flow and generates a reaction force and/or moment that accurately correlates to the actual grain mass flow, while implementing the durability, accuracy, minimum calibration, stability, and single mounting point advantages of the single point load cell torque or moment compensated force transducer 112.

Figure 13A:
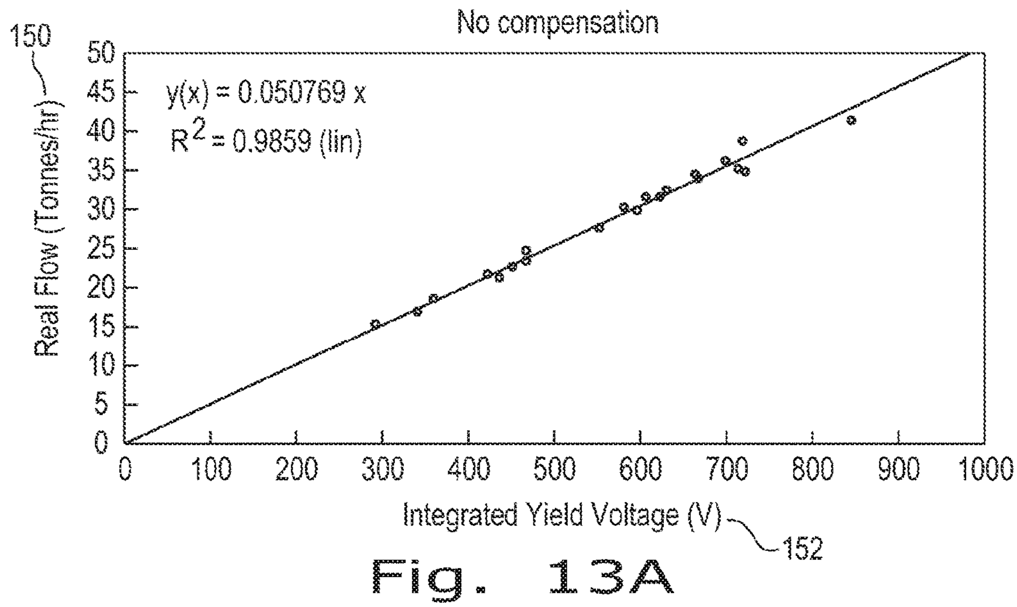
FIGS. 13A and 13B are graphical representations of the relationship between grain mass flow rate and the mass flow sensor signal under condition of no slope compensation.
Figure 13B:
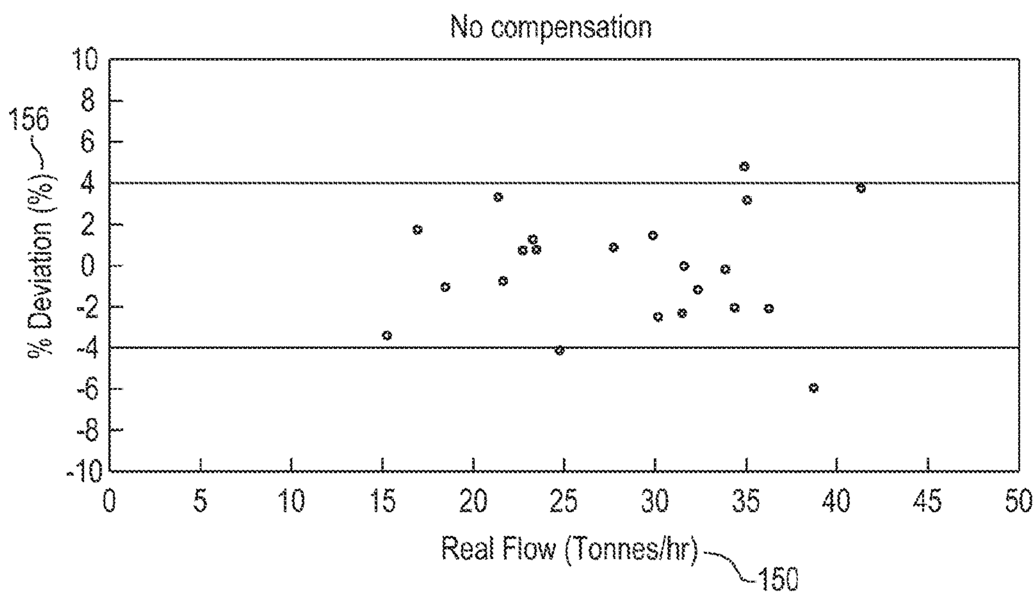
Figure 14A:
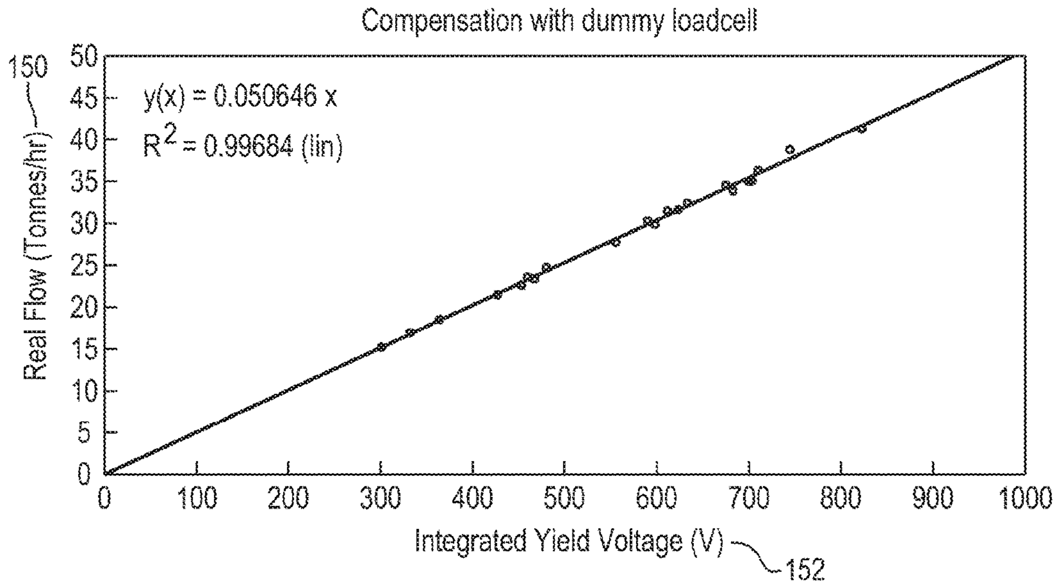
FIGS. 14A and 14B are graphical representations of the relationship between grain mass flow rate and the mass flow sensor signal under condition of slope compensation using a dummy load cell.
Figure 14B:
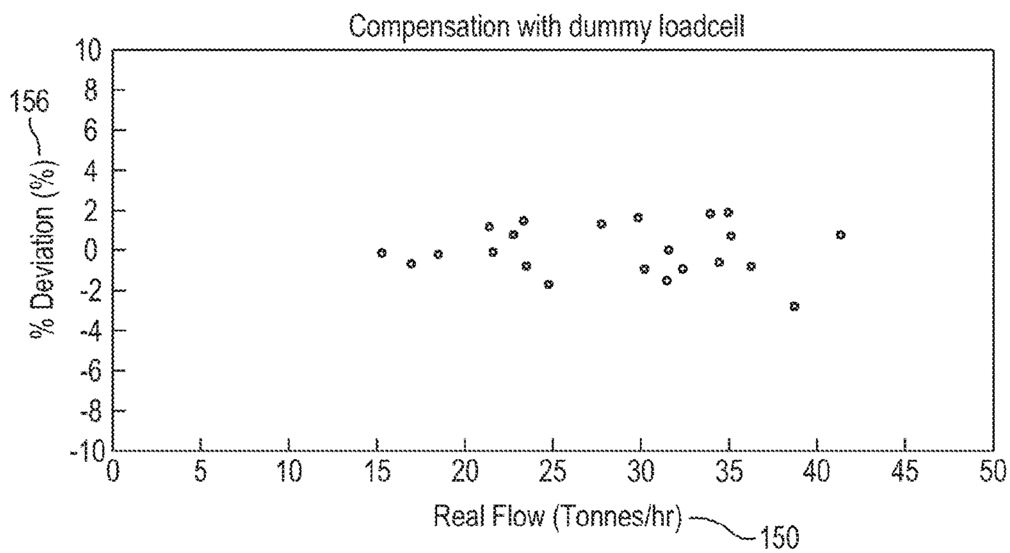
Figure 15A:
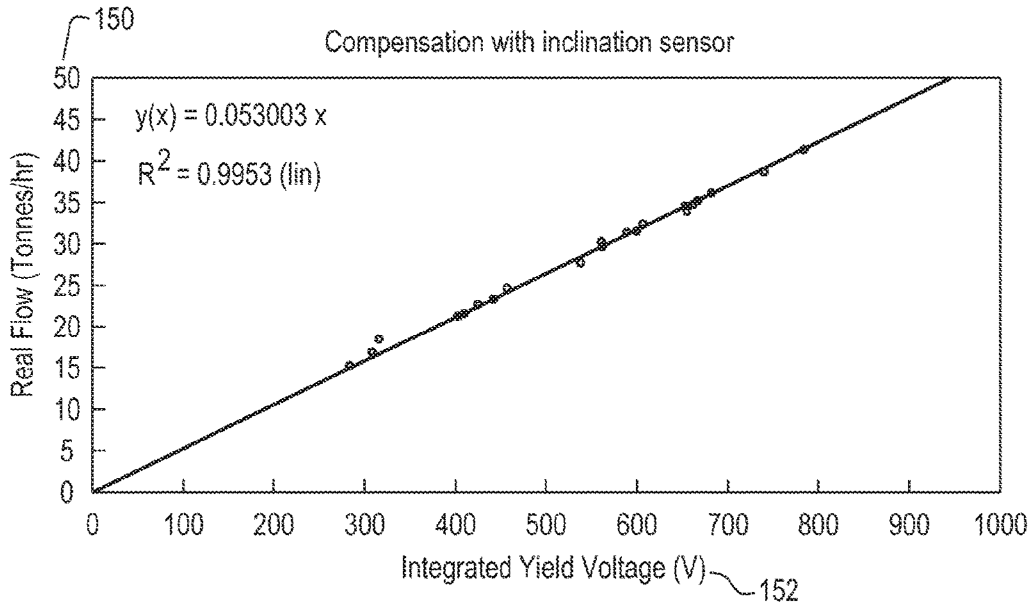
FIGS. 15A and 15B are graphical representations of the relationship between grain mass flow rate and the mass flow sensor signal under condition of slope compensation using an inclination sensor.
Figure 15B:
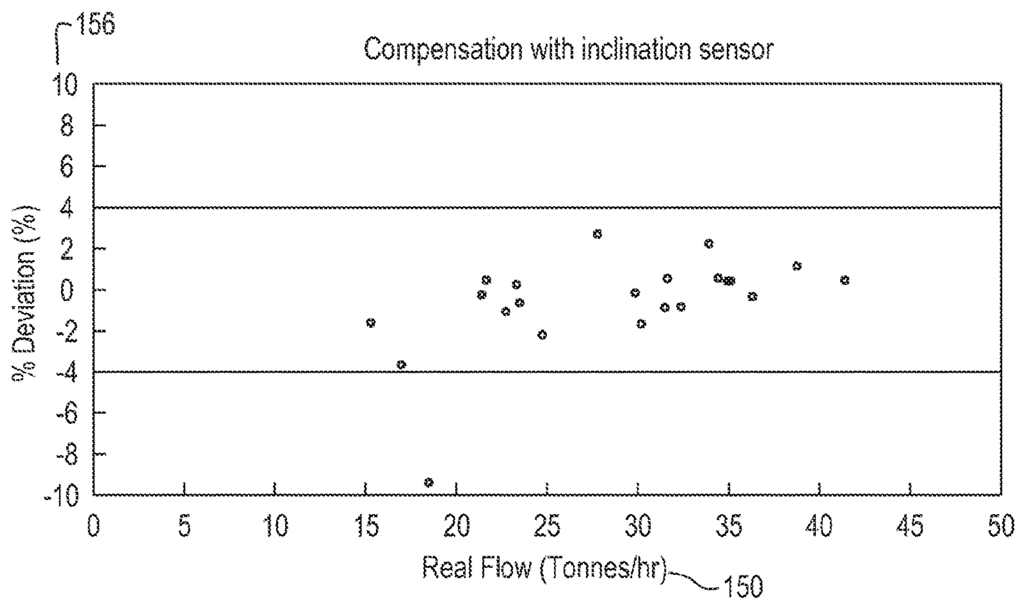

FIGS. 13A, 13B, 14A, 14B, 15A, and 15B show relative performance of the present invention used without slope compensation, with a dummy load cell and dummy weight used for slope compensation, and with a dual axis slope sensor used for slope compensation, respectively. FIGS. 13A, 14A, and 15A show the linear performance of the single point load cell torque or moment compensated force transducer in correlating real grain mass flow 150 versus integrated yield voltage 152. Note that a linear relationship is portrayed in FIGS. 13A, 14A, and 15A, although the relationship may in fact be a non-linear function, with a commensurate improvement in accuracy using a dummy load cell and dummy weight, or dual axis slope sensor, for slope compensation. FIGS. 13B, 14B, and 15B show the percent deviation 156 versus real grain mass flow 150 in scatter plots.

Figure 16A:
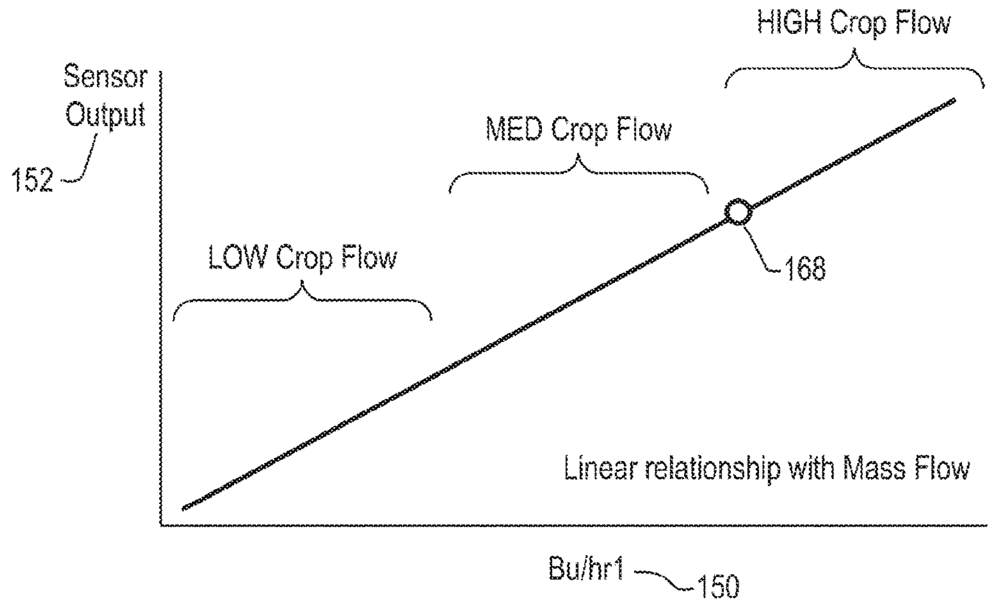
FIGS. 16A and 16B are graphical representations of the relationship between grain mass flow rate and the mass flow sensor signal showing the number of required calibration points according to an embodiment of the present invention and according to the prior art, respectively.
Figure 16B:
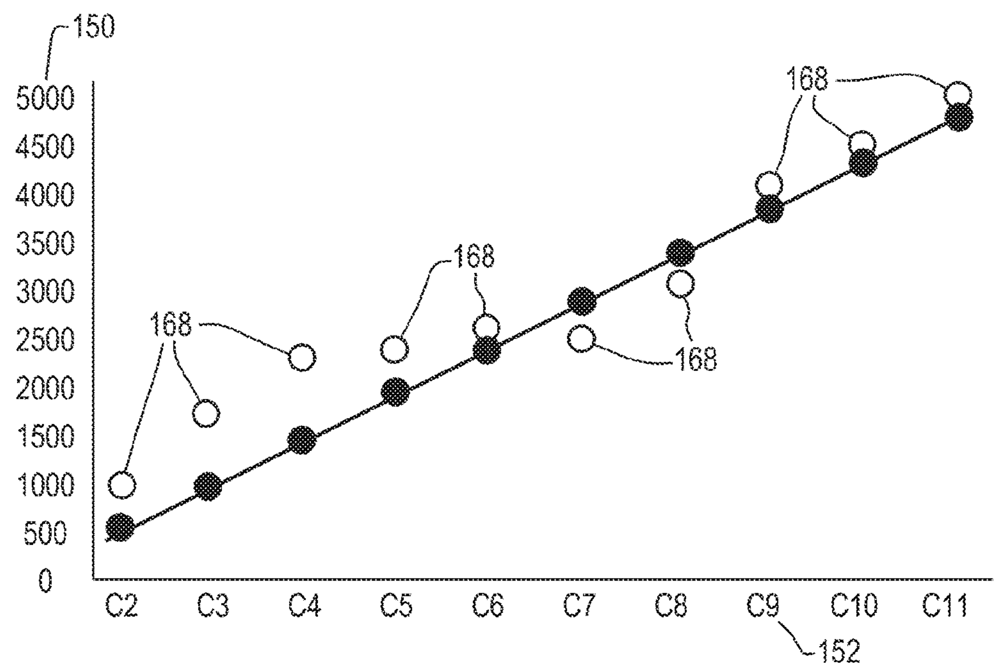
Figure 17:
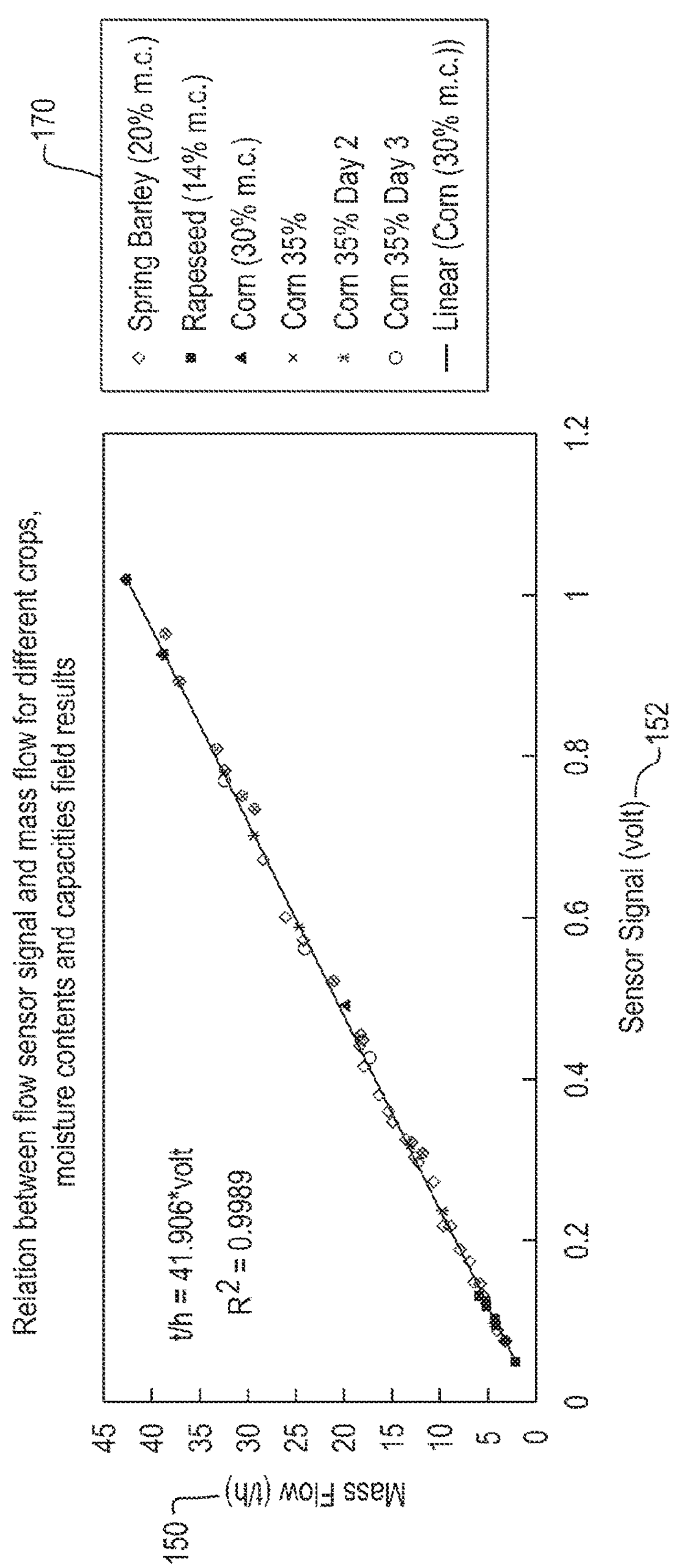
FIG. 17 is a graphical representation of the relationship between grain mass flow rate and the mass flow sensor signal for various crops using an embodiment of the present invention.

FIGS. 16A and 16B show, for example, linear performance of the single point load cell torque or moment compensated force transducer in correlating the signal output 152 to the real grain mass flow 150 using only a single calibration point 168 (FIG. 16A) as compared to the poor performance of the prior art torque sensor in correlating the real grain mass flow 150 versus the signal output 152 (FIG. 16B). Note that the prior art torque sensor equipped grain mass flow sensor assembly requires multiple calibration points 168 in order to compensate. Similar to FIGS. 13A, 14A, and 15A, the single point load cell torque or moment compensated force transducer may not produce a linear relationship as portrayed in FIG. 17, but may instead produce a non-linear relationship with improved accuracy requiring fewer calibration points 168. FIG. 17 shows the performance of the single point load cell torque or moment compensated force transducer in correlating the signal output 152 to the real grain mass flow 150 in measuring the real grain mass flow of various crops, moisture contents, and capacities 170. Again, such correlation is illustrated as linear, but may in fact be non-linear, while retaining the same improved crop, moisture, and capacity independent performance.

Figure 18A:
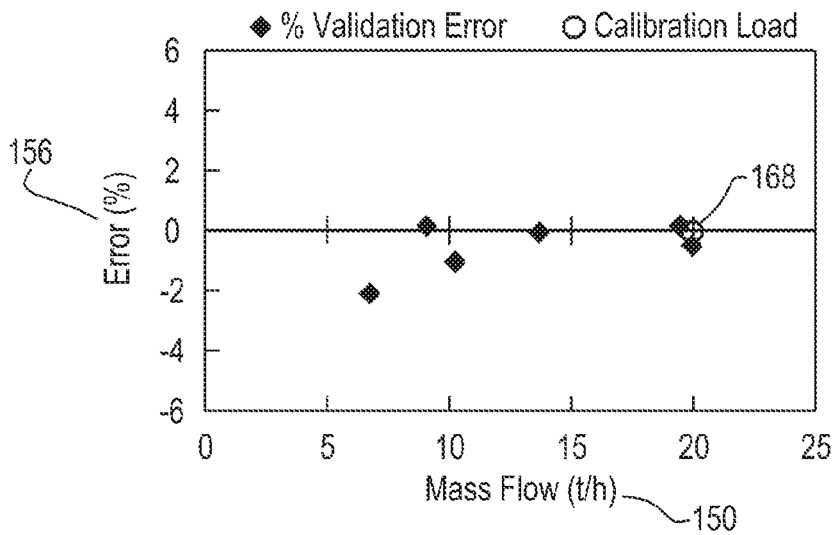
FIGS. 18A and 18B are graphical representations of the relationship between grain mass flow rate and the mass flow sensor signal deviation showing the number of required calibration points according to an embodiment of the present invention and according to the prior art, respectively.
Figure 18B:
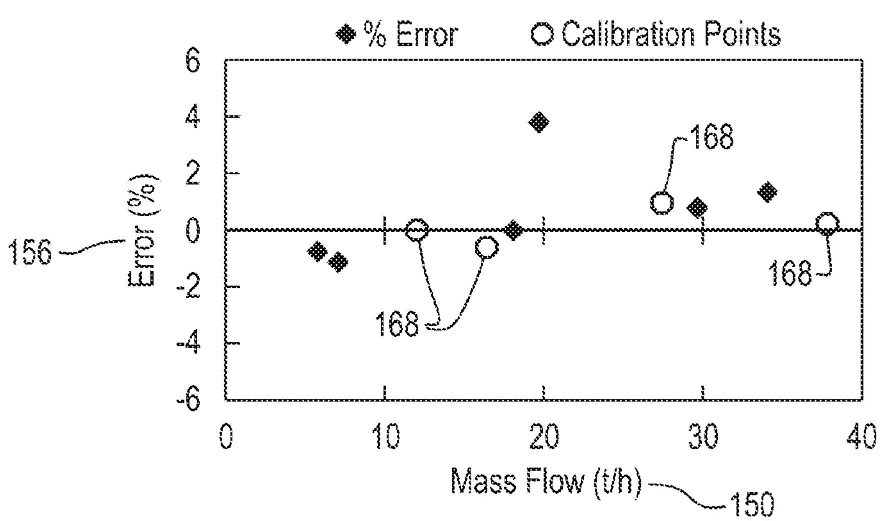
Figure 19:
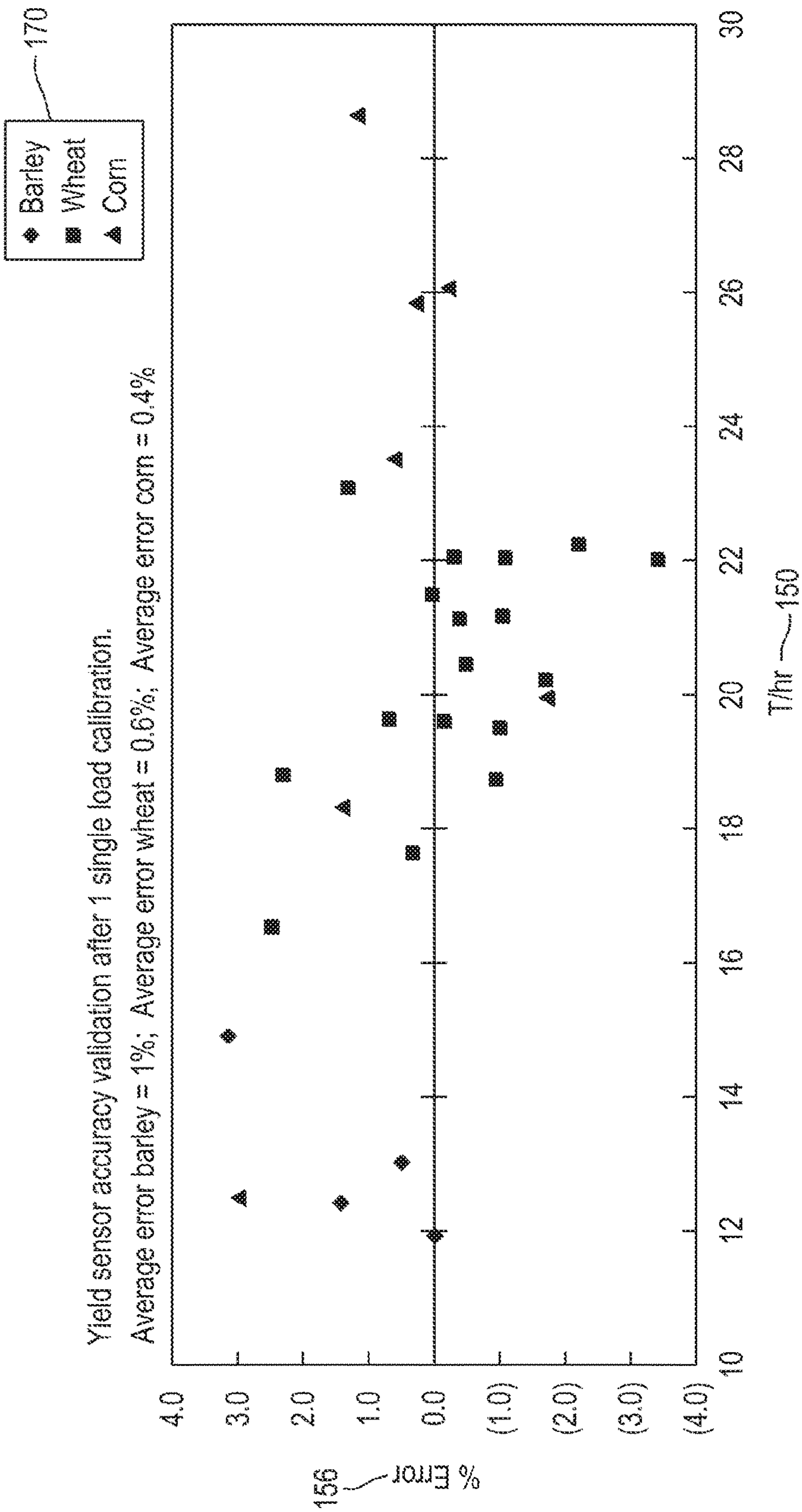
FIG. 19 is a graphical representation of the relationship between grain mass flow rate and the mass flow sensor signal deviation for various crops using an embodiment of the present invention.

FIGS. 18A and 18B show field results including percent validation error 156 in measuring grain mass flow rate 150 for embodiments of the present invention requiring only one calibration point 168 (FIG. 18A), as compared to the percent validation error 156 in measuring grain mass flow rate 150 for the prior art, which requires multiple calibration points 168 (FIG. 18B). FIG. 19 shows field results in percent error 156 versus grain mass flow rate 150 for embodiments of the present invention after a single load calibration in various crops 170. Note that the percent error scale 150 is greatly magnified, and that the average error for the various crops is 1% or less.

The invention claimed is:

1. A grain mass flow sensor assembly of an agricultural harvester having a threshing and separating system, a cleaning system, and a grain elevator, the grain mass flow sensor assembly comprising:

a continuously curved sensor plate positioned to receive a grain flow from an exit of the grain elevator and configured to change a direction of the grain flow in order to generate a reaction force for measuring a grain mass flow rate of the grain flow, wherein the continuously curved sensor plate is attached to a sensor plate to load cell mounting bracket, the sensor plate to load cell mounting bracket being attached to a single point load cell torque or moment compensated force transducer at a single mounting point, the single point load cell torque or moment compensated force transducer producing a mass flow sensor signal that is proportionate to the grain mass flow rate.

2. The grain mass flow sensor assembly of claim 1, wherein the single point load cell torque or moment compensated force transducer produces a mass flow sensor signal that is either linearly proportionate or non-linearly proportionate to the grain mass flow rate.

3. The grain mass flow sensor assembly of claim 1, wherein a position of the single mounting point of the sensor plate to load cell mounting bracket to the single point load cell torque or moment compensated force transducer, and an orientation of the single point load cell torque or moment compensated force transducer, are chosen to correspond with a geometry that minimizes a dependence of the reaction force upon a frictional property of the grain flow.

4. The grain mass flow sensor assembly of claim 1, wherein the single point load cell torque or moment compensated force transducer produces the mass flow sensor signal substantially independently of any torque moment generated other than at a desired torque or moment measuring point or substantially independently of any net force in other than a desired force measuring direction F, $F_r$.

5. The grain mass flow sensor assembly of claim 1, wherein the single point load cell torque or moment compensated force transducer is connected to an electronic control system, the electronic control system being one of a control module dedicated to the single point load cell torque or moment compensated force transducer and integrated with another electronic control system of the agricultural harvester.

6. The grain mass flow sensor assembly of claim 5, further comprising:

a dual axis slope sensor connected to the electronic control system, the dual axis slope sensor providing a correction signal to the electronic control system, the correction signal from the dual axis slope sensor being used by the electronic control system to compensate for a weight of the continuously curved sensor plate under various slope, incline, and dynamic acceleration conditions of the agricultural harvester.

7. The grain mass flow sensor assembly of claim 6, wherein the dual axis slope sensor has signal dynamics and the single point load cell torque or moment compensated force transducer has signal dynamics, the signal dynamics of the dual axis slope sensor corresponding with the signal dynamics of the single point load cell torque or moment compensated force transducer.

8. The grain mass flow sensor assembly of claim 5, further comprising:

a dummy load cell having a dummy weight, the dummy load cell being connected to the electronic control system, the dummy load cell providing a correction signal to the electronic control system, the correction signal from the dummy load cell being used by the electronic control system to compensate for a weight of the continuously curved sensor plate under various slope, incline, and dynamic acceleration conditions of the agricultural harvester.

9. The grain mass flow sensor assembly of claim 8, wherein the dummy load cell and the dummy weight simulate time constants, slope effects, and inertial responses of the single point load cell torque or moment compensated force transducer and the continuously curved sensor plate under a no-flow condition.

10. The grain mass flow sensor assembly of claim 6, wherein the electronic control system filters the correction signal to improve a correlation of the correction signal with respect to a characteristic response of the single point load cell torque or moment compensated force transducer and the continuously curved sensor plate to changes in slope, incline, and dynamic accelerations.

11. The grain mass flow sensor assembly of claim 1, further comprising:

a grain elevator exit concentration plate directing the grain flow so that it engages the continuously curved sensor plate near an inlet region, the grain flow flowing along the continuously curved sensor plate through to an exit region, in order to generate a reaction force that accurately correlates to an actual grain mass flow rate.

12. The grain mass flow sensor assembly of claim 1, further comprising:

continuously curved sensor plate sidewalls attached to the continuously curved sensor plate.

13. An agricultural harvester comprising:

a chassis;

a threshing and separating system carried by the chassis for separating grain from material other than grain;

a cleaning system receiving grain from the threshing and separating system for further cleaning the grain;

a grain elevator receiving cleaned grain from the cleaning system; and a grain mass flow sensor assembly comprising a continuously curved sensor plate positioned to receive a grain flow from an exit of the grain elevator and configured to change a direction of the grain flow in order to generate a reaction force for measuring a grain mass flow rate of the grain flow, wherein the continuously curved sensor plate is attached to a sensor plate to load cell mounting bracket, the sensor plate to load cell mounting bracket being attached to a single point load cell torque or moment compensated force transducer at a single mounting point, the single point load cell torque or moment compensated force transducer producing a mass flow sensor signal that is proportionate to the grain mass flow rate.

14. The agricultural harvester of claim 13, wherein the single point load cell torque or moment compensated force transducer produces a mass flow sensor signal that is either linearly proportionate or non-linearly proportionate to the grain mass flow rate.

15. The agricultural harvester of claim 13, wherein a position of the single mounting point of the sensor plate to load cell mounting bracket to the single point load cell torque or moment compensated force transducer, and an orientation of the single point load cell torque or moment compensated force transducer, are chosen to correspond with a geometry that minimizes a dependence of the reaction force upon a frictional property of the grain flow.

16. The agricultural harvester of claim 13, wherein the single point load cell torque or moment compensated force transducer produces the mass flow sensor signal substantially independently of any torque moment generated other than at a desired torque or moment measuring point or substantially independently of any net force in other than a desired force measuring direction F, $F_r$.

17. The agricultural harvester of claim 13, wherein the single point load cell torque or moment compensated force transducer is connected to an electronic control system, the electronic control system being one of a control module dedicated to the single point load cell torque or moment compensated force transducer and integrated with another electronic control system of the agricultural harvester.

18. The agricultural harvester of claim 17, wherein the grain mass flow sensor assembly further comprises:

a dual axis slope sensor connected to the electronic control system, the dual axis slope sensor providing a correction signal to the electronic control system, the correction signal from the dual axis slope sensor being used by the electronic control system to compensate for a weight of the continuously curved sensor plate under various slope, incline, and dynamic acceleration conditions of the agricultural harvester.

19. The agricultural harvester of claim 18, wherein the dual axis slope sensor has signal dynamics and the single point load cell torque or moment compensated force transducer has signal dynamics, the signal dynamics of the dual axis slope sensor corresponding with the signal dynamics of the single point load cell torque or moment compensated force transducer.

20. The agricultural harvester of claim 17, wherein the grain mass flow sensor assembly further comprises:

a dummy load cell having a dummy weight, the dummy load cell being connected to the electronic control system, the dummy load cell providing a correction signal to the electronic control system, the correction signal from the dummy load cell being used by the electronic control system to compensate for a weight of the continuously curved sensor plate under various slope, incline, and dynamic acceleration conditions of the agricultural harvester.

* * * * *